United States Patent
Vijayakumari Mahasenan et al.

(10) Patent No.: US 10,505,749 B1
(45) Date of Patent: Dec. 10, 2019

(54) INTEGRATING FUNCTIONALITY IN A LINE POWERED DEVICE OF A FACILITY

(71) Applicant: Honeywell International Inc., Morris Plains, NJ (US)

(72) Inventors: Arun Vijayakumari Mahasenan, Hopkins, MN (US); Aravind Padmanabhan, Plymouth, MN (US); Samuel George Fenton, Glenwood (AU)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/026,929

(22) Filed: Jul. 3, 2018

(51) Int. Cl.
  *F24F 11/00* (2018.01)
  *H04L 12/28* (2006.01)
  *H04L 12/24* (2006.01)

(52) U.S. Cl.
  CPC ...... *H04L 12/2807* (2013.01); *H04L 41/0806* (2013.01); *H04L 41/0883* (2013.01)

(58) Field of Classification Search
  CPC ............. H04L 12/2803; H04L 41/0803; H04L 67/125; H04W 84/18
  See application file for complete search history.

(56) References Cited

U.S. PATENT DOCUMENTS

| | | | |
|---|---|---|---|
| 9,130,910 B1 * | 9/2015 | Logue | H04L 63/0428 |
| 9,534,930 B1 * | 1/2017 | Stamatakis | H04W 4/70 |
| 2008/0074254 A1 * | 3/2008 | Townsend | G01W 1/17 340/539.11 |
| 2014/0379141 A1 * | 12/2014 | Patil | F24F 11/30 700/277 |

* cited by examiner

*Primary Examiner* — Hongmin Fan
(74) *Attorney, Agent, or Firm* — Brooks, Cameron & Huebsch, PLLC

(57) ABSTRACT

Integrating functionality in a line powered device of a facility is described herein. One method includes integrating, in a line powered device of a facility that has a first functionality, a second functionality, obtaining, by the line powered device, information associated with the facility using the second functionality, and sending, by the line powered device, the information associated with the facility obtained using the second functionality to a computing device.

17 Claims, 4 Drawing Sheets

INTEGRATING FUNCTIONALITY IN A LINE POWERED DEVICE OF A FACILITY

TECHNICAL FIELD

The present disclosure relates generally to integrating functionality in a line powered device of a facility.

BACKGROUND

The equipment and infrastructure of a facility, such as that of a building, industrial space, manufacturing plant, or warehouse, may need to support multiple diverse services for the owners, managers, tenants, workers, and/or guests of the facility based on the type of facility and/or occupants. As an example, the location of people and/or equipment (e.g., assets) in a facility may be a key parameter for enabling comfort and/or productivity, and as such a manager of the facility may want to know how space is being utilized in the facility and/or the occupancy of the space.

However, in order to obtain the information (e.g., data) needed to support such services, additional infrastructure may need to be added to (e.g., deployed in) the facility, and/or the existing infrastructure of the facility may need to be altered, which may be difficult, costly, and/or time consuming. Further, such infrastructure addition and/or alteration may result in increased maintenance costs for the facility.

DETAILED DESCRIPTION

Figure 1:
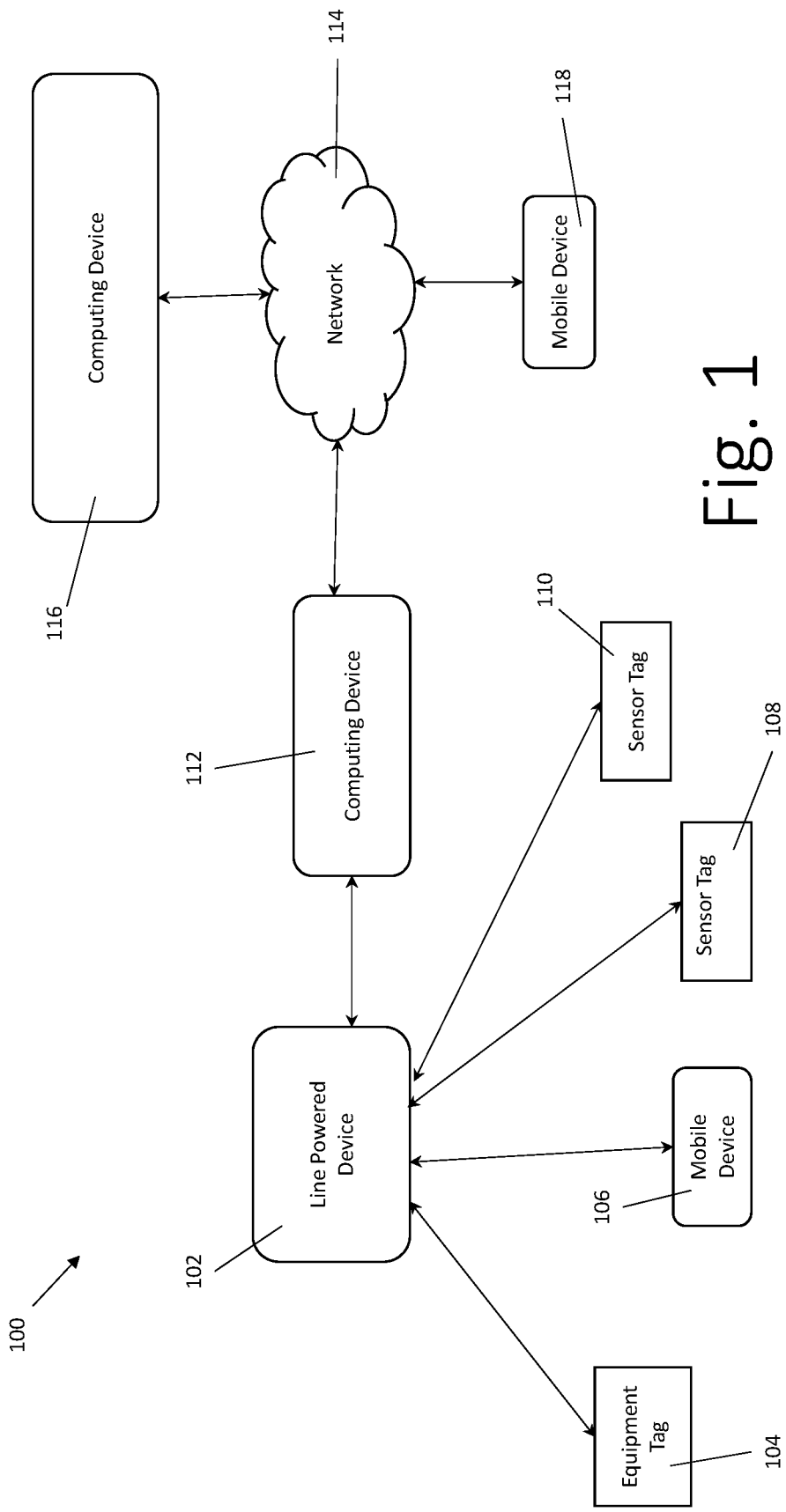
FIG. 1 illustrates an example of a system for integrating functionality in a line powered device of a facility in accordance with an embodiment of the present disclosure.

Integrating functionality in a line powered device of a facility is described herein. For example, an embodiment includes integrating, in a line powered device of a facility that has a first functionality, a second functionality, obtaining, by the line powered device, information associated with the facility using the second functionality, and sending, by the line powered device, the information associated with the facility obtained using the second functionality to a computing device.

Embodiments of the present disclosure can integrate additional and/or new functionality into line powered devices of a facility without adding to or altering the existing infrastructure of the facility. For example, embodiments of the present disclosure can leverage the existing sensor devices, controllers, communication equipment, or other line (e.g., ceiling) powered equipment of a facility, such as, for instance, fire and/or smoke detectors, fire pull stations, remote fire annunciators, fire control panels and/or modules, wall modules (e.g., thermostats), public address/voice alarm (PA/VA) systems (e.g., speakers), alarms (e.g., strobes), mass notification systems, signage, cameras, security sensors, access control systems (e.g., electronic locks), and/or HVAC sensors and/or equipment, among others.

As an additional example, embodiments of the present disclosure can integrate additional and/or new functionality into line powered devices of a facility in which infrastructure is being added or replaced. For example, embodiments of the present disclosure can integrate additional and/or new functionality into a new line powered device that is replacing an existing line powered device in the infrastructure of the facility. As an additional example, embodiments of the present disclosure can integrate additional and/or new functionality into a line powered device that is part of a new system being added to the infrastructure of the facility (e.g., during the fitting of a new facility that does not yet have any infrastructure).

Accordingly, embodiments of the present disclosure can obtain the information needed to support multiple diverse services for the owners, managers, tenants, workers, and/or guests of the facility in a less difficult, less costly, and/or less time consuming manner than previous approaches that may require addition and/or alteration to the existing infrastructure. For instance, embodiments of the present disclosure can be scalable to address and enable multiple communication, sensing (e.g., space, environment, air quality, and/or noise sensing), location (e.g., real time location service and/or wayfinding), occupancy, equipment (e.g., asset) tracking, comfort control, energy management, fire system, security management, HVAC control, space utilization, and/or occupancy tracking applications in an integrated manner.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 302 in FIG. 3.

As used herein, "a" or "a number of" something can refer to one or more such things, while "a plurality of" something can refer to more than one such things. For example, "a number of sensor devices" can refer to one or more sensor devices, while "a plurality of sensor devices" can refer to more than one sensor device.

FIG. 1 illustrates an example of a system 100 for integrating functionality in a line powered device 102 of a facility in accordance with an embodiment of the present disclosure. The facility can be, for example, an indoor space such as a building, industrial space, manufacturing plant, warehouse, factory, mining facility, agricultural facility, parking garage or ramp, health care facility (e.g., hospital), airport, retail facility (e.g., shopping complex) or hotel, among other types of facilities and/or indoor spaces. However, embodiments of the present disclosure are not limited to a particular facility or facility type.

Line powered device 102 can be any type of device that is powered by, or is capable of being powered by, a power line of the facility. For example, line powered device 102 can be any type of line powered sensor device (e.g., a hardware device) having the capability of (e.g., embedded software capable of) measuring and/or detecting data (e.g., temperature, pressure, humidity, light, motion, sound, carbon air quality, vibration, etc.). As an additional example, line powered device 102 can be an actuating, alert, and/or notification device. For example, line powered device 102 can be a fire and/or smoke detector, a wall module (e.g., thermostat), a temperature and/or humidity sensor, a light sensor, a component of a public address/voice alarm (PA/VA) system (e.g., a speaker), an alarm (e.g., a fire strobe), a component of a mass notification system, electronic signage (e.g., a signage display), a camera, a security sensor, an electronic lock, and/or an HVAC sensor and/or equipment, among other types of line powered devices. However, embodiments of the present disclosure are not limited to a particular line powered device or type of line powered device.

Line powered device 102 can be part of the existing infrastructure (e.g., the existing lighting, fire, security, and/or HVAC infrastructure) of the facility. For example, line powered device 102 may be installed (e.g., deployed) in the existing infrastructure of the facility in accordance with the applicable safety (e.g., UL) codes, and may be line powered from a loop circuit. As an additional example, line powered device 102 may be replacing an existing line powered device in the infrastructure of the facility, or may be part of a new system being added to the infrastructure of the facility (e.g., during the fitting of a new facility that does not yet have any infrastructure).

Although one (e.g., a single) line powered device 102 is illustrated in FIG. 1 for simplicity and so as not to obscure embodiments of the present disclosure, embodiments are not so limited. For example, system 100 can include any number of line powered devices analogous to line powered device 102, which may be collectively referred to as line powered device 102.

Line powered device 102 may have a first (e.g., single and/or initial) functionality that was, for instance, part of line powered device 102 when it was installed in the existing infrastructure of the facility. The first functionality may be, for instance, the capability of measuring and/or detecting a particular type or types of data (e.g., the type(s) of data the sensor device was originally designed, manufactured, and/or installed to measure and/or detect).

In an embodiment of the present disclosure, a second (e.g., additional and/or new) functionality can be integrated (e.g., added and/or updated) in line powered device 102. For instance, the second functionality may be integrated in line powered device 102 after device 102 was installed in the existing infrastructure of the facility, and can include functionality line powered device 102 was not capable of when it was installed in the existing infrastructure of the facility. Examples of the second functionality will be further described herein.

The second functionality can be integrated in line powered device 102 without adding to or altering the existing infrastructure of the facility. For example, the second functionality can be integrated in line powered device 102 by adding a module having the second functionality to line powered device 102. An example of such a module will be further described herein (e.g., in connection with FIG. 3). As an additional example, the second functionality can be integrated in line powered device 102 by replacing the original sensing mechanism of device 102 (e.g., that has only the first functionality) with a sensing mechanism that has both the first functionality and the second functionality. For instance, the first functionality may include only a first type of sensing mechanism (e.g., a first type of sensor), and the second functionality may include both the first type of sensing mechanism (e.g., the first type of sensor) and a second type of sensing mechanism (e.g., a second type of sensor).

As an example, a system of climate sensors (e.g., temperature, humidity, infrared, light,) can be combined with air quality sensors (e.g., carbon monoxide, particulates, volatile organic compounds) and integrated in line powered device 102. As an additional example, a system of microphone sensors with voice recognition, voice interaction, and/or voice control capabilities and speakers can be integrated in line powered device 102. As an additional example, a combination of sensors, including, for instance, radios, climate sensors, microphone sensors, light sensors, vibration sensors, and/or air quality sensors, can be integrated in line powered device 102 (e.g., to create a "super sensor").

After the second functionality has been integrated in line powered device 102, line powered device 102 can obtain (e.g., receive and/or sense) information associated with the facility using both the first functionality and the second functionality. For instance, after the second functionality has been integrated in line powered device 102, device 102 can obtain not only information (e.g., data) it was capable of obtaining (e.g., sensing) when it was installed in the existing infrastructure of the facility, but also information it was not capable of obtaining when it was installed in the existing infrastructure of the facility.

As an example, line powered device 102 can use the second functionality to obtain space utilization (e.g., occupancy) data associated with the facility, such as, for instance, location data associated with people (e.g. occupants) and/or equipment (e.g., assets) in the facility. That is, the second functionality may include the capability of obtaining such space utilization (e.g., location) data.

For example, as shown in FIG. 1, system 100 can include an equipment (e.g., asset) tag 104 and a mobile device 106. Equipment tag 104 can be, for instance, a tag (e.g., badge) attached or coupled to an item of equipment in the facility, and mobile device 106 can be, for instance, the mobile device (e.g., smart phone, tablet, smart wearable device, etc.) of a person (e.g., occupant) in the facility. Line powered device 102 can obtain (e.g., receive) location data from equipment tag 104 and mobile device 106. The location data received from equipment tag 104 and mobile device 106 can indicate the current location of the item of equipment and the person in the facility, respectively. Line powered device 102 may also receive communication messages generated by equipment tag 104. For instance, a person who needs help may press a button (e.g., a help or duress button) in the tag 104, and the tag can send a message (e.g. a help or duress message) to line powered device 102.

Line powered device 102 can receive the location data and communication messages from equipment tag 104 via a first type of wireless communication, and line powered device 102 can receive the location data from mobile device 106 via a second (e.g., different) type of wireless communication. For example, line powered device 102 can receive the location data and communication messages from equipment tag 104 via sub gigahertz (e.g., 900 megahertz) signals transmitted from equipment tag 104, and line powered device 102 can receive the location data from mobile device 106 via Bluetooth (e.g., BLE) or Wi-Fi signals transmitted from mobile device 106, or from acoustic signals such as ultrasound transmitted from mobile device 106.

Line powered device 102 can receive the location data and communication messages from equipment tag 104 and mobile device 106 using a communication module (e.g., a radio communication module). For instance, the communication module can be part of the second functionality integrated in line powered device 102, and can include a signal receiver that can receive the location data from equipment tag 104 and mobile device 106. The communication module will be further described herein (e.g., in connection with FIG. 3).

Further, line powered device 102 can use the second functionality to obtain sensed data associated with the facility, such as, for instance, temperature, humidity, air quality (e.g., carbon monoxide) visible and/or infrared light, fire and/or smoke, and/or noise level, among other types of sensed data. That is, the second functionality may include the capability of obtaining such sensed data, which line powered device 102 was not able to previously obtain using the first functionality.

Line powered device 102 may obtain the sensed data by, for example, directly sensing the data using the using the sensing module or mechanism integrated in line powered device 102. As an additional example, line powered device 102 may receive the sensed data from sensor tags 108 and 110 illustrated in FIG. 1. Sensor tags 108 and 110 can be, for instance, an ultrasound sensor tag and an infrared sensor tag, respectively, located in the facility. Line powered device 102 can receive the sensed data from sensor tags 108 and 110 via wireless communication (e.g., via sub gigahertz signals or BLE signals transmitted by sensor tags 108 and 110) using the communication module (e.g., the signal receiver of the communication module) as part of the second functionality.

Although not shown in FIG. 1 for simplicity and so as not to obscure embodiments of the present disclosure, in an embodiment an additional (e.g., stand-alone) line powered (e.g., sensor) device having the first functionality and the second functionality can be added to the existing infrastructure of the facility. For instance, the sensor device may be added to fill a gap (e.g., a hole) determined to exist in the coverage area of line powered device 102.

Line powered device 102 can use the second functionality to send (e.g., transmit) the information obtained using the first functionality and the information obtained using the second functionality to computing device 112 illustrated in FIG. 1. For example, line powered device 102 can send the obtained information to computing device 112 via wireless communication, such as, for instance, Bluetooth communication using the communication module. For instance, the communication module can include a signal transmitter that can send the obtained information to computing device 112 as part of the second functionality. Computing device 112 can be, for example a gateway device located at the facility, and will be further described herein (e.g., in connection with FIG. 4).

Line powered device 102 can also use the second functionality to send the information obtained using the first and second functionalities to an additional line powered device(s) (e.g., a different one(s) of the line powered devices) that is part of the existing infrastructure of the facility. For example, line powered device 102 can send the obtained information to the additional sensor device(s) via radio communication using the communication module (e.g., the signal transmitter of the communication module) as part of the second functionality. The radio communication can occur through a network between the devices such as, for example, an Internet of Things (IoT) network, through which the devices can connect and exchange information using their respective communication modules. The additional sensor device can use this information to determine how and/or when to perform an action.

Line powered device 102 can also use the second functionality to send the information obtained using the first and second functionalities to an additional sensor device that is not part of the existing infrastructure of the facility, such as, for instance, a third-party sensor device. For example, line powered device 102 can send the obtained information to the additional sensor device via wireless communication using the communication module (e.g., the signal transmitter of the communication module) as part of the second functionality.

Upon receiving the information obtained using the first and second functionalities from line powered device 102, computing device 112 can send (e.g., transmit) the information to computing device 116 via network 114 illustrated in FIG. 1. Computing device 116 can be located remotely from the facility (e.g., remotely from computing device 112). For instance, computing device 116 can be part of a centralized, cloud-based analytics service (e.g., servers and/or databases).

Network 114 can be a wired or wireless network. For example, network 114 can be a network relationship through which computing devices 112 and 116 can communicate. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, the network can include a number of servers that receive the information from computing device 112, and transmit the anomalous audio portion to computing device 116 via a wired or wireless network.

As used herein, a "network" can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

Computing device 116 can use the information received from computing device 112 (e.g., the information obtained by line powered device 102 using the first and second functionalities) to provide software-based services for the facility. For example, computing device can use the information to run (e.g., address, enable, and/or operate) multiple facility management apps, such as, for instance, communication, sensing (e.g., space, environment, air quality, and/or noise sensing), location (e.g., real time location service and/or wayfinding), occupancy, equipment (e.g., asset) tracking, comfort control, energy management, fire and safety, fire system, security management, HVAC control, space utilization, labor productivity, and/or environmental monitoring applications, in an integrated manner. For example, computing device 116 can use the information to run such applications as mobile apps on mobile device 118 via network 114 illustrated in FIG. 1. Mobile device 118 can be, for example, the mobile device (e.g., smart phone, tablet, smart wearable device, etc.) of, for example, an owner, manager, technician, security personnel, emergency personnel, tenant, worker, or guest of the facility, depending upon the application being utilized.

As an example, a location services application can use the information obtained by line powered device 102 using the first and second functionalities to locate equipment (e.g., assets) in a facility, locate people in the facility, allow a user to identify his or her location in the facility using his or her mobile device, assist with staff workflow, identify under-utilized and/or over-utilized areas of the facility, identify tenant traffic in the facility (e.g., to provide targeted marketing materials), provide car parking directions, automatically park self-driving cars in parking garages, provide piloting and/or navigational assistance to delivery vehicles (e.g., drones) in the facility, control HVAC equipment and lighting to achieve energy efficiency, and/or provide automatic navigation inside the facility for machines such as wheel chair navigation to a destination or robots for building automation activities such as cleaning or delivery, among other uses.

As an additional example, a system of climate sensors (e.g., temperature, humidity, infrared, light,) can be combined with air quality sensors (e.g., carbon monoxide, particulates, volatile organic compounds) and integrated in line powered device 102. In such an example, a climate control application can use the information obtained by line powered device 102 to control the HVAC equipment of the facility to cool, heat, humidify, and/or dehumidify specific areas of the facility, identify sources of heat loss (e.g., ovens, poor window seals, poorly insulated walls, etc.) that can be adjusted to increase the efficiency of the HVAC system of the facility, identify area occupancy and adjust the energy consumption of the HVAC system accordingly (e.g., to not waste energy), and/or identify stale air and/or high levels of pollutants and control the HVAC system to bring fresh air into the facility, among other uses.

As an additional example, a security application can use the information obtained by line powered device 102 using the first and second functionalities to identify that someone is within a specific security area within the facility, identify unauthorized personnel (e.g., intruders) and distinguish them from authorized personnel, provide a record of peoples' movements throughout the facility, and/or provide an alert to security personnel upon a person being in an area in the facility in which they should not be, among other uses.

As an additional example, a system of microphone sensors with voice recognition, voice interaction, and/or voice control capabilities and speakers can be integrated in line powered device 102. In such an example, the system can be used to call for a nurse in a hospital, call for assistance (e.g., police, fire, and/or ambulance) in an emergency, provide mass notification alarms and two-way communication with authorities in the event of a security event (e.g., fire, bomb threat, gunman, etc.), ask for directions to a location in the facility, ask for information about the facility (e.g., cafeteria specials, shop hours, etc.), and/or provide facility maintenance personnel instructions on how to perform a task and/or what needs to be done in an area of the facility (e.g., informing housekeeping staff if people are checking out of a hotel, what steps to perform in the room, which room to clean next, etc.), among other uses.

As an additional example, a combination of sensors, including, for instance, radios, climate sensors, microphone sensors, light sensors, vibration sensors, and/or air quality sensors, can be integrated in line powered device 102 (e.g., to create a "super sensor"). In such an example, line powered device 102 can be used to provide baseline environment conditions of the facility, and identify abnormalities in the conditions. The identification of an abnormality can be tagged as a specific event that can cause a notification to be set, and/or trigger an event to be performed by other equipment in the facility. For example, upon detecting a drill has been turned on, the device (e.g., the super sensor) can send a notification to exhaust fans of the facility to turn on, and then send another notification to turn off after (e.g., two minutes after) the drill has finished. As an additional example, upon detecting a faucet tap is dripping, the device can send a notification to the management of the facility to fix the faucet. As an additional example, upon detecting a person walking into a shop, the device can send the staff (who may be in a back room) a notification that someone has entered. As an additional example, the device can listen to when paper towels are taken out of a dispenser, and send a notification to cleaning staff that the paper towels need to be replaced when they get low.

Figure 2:
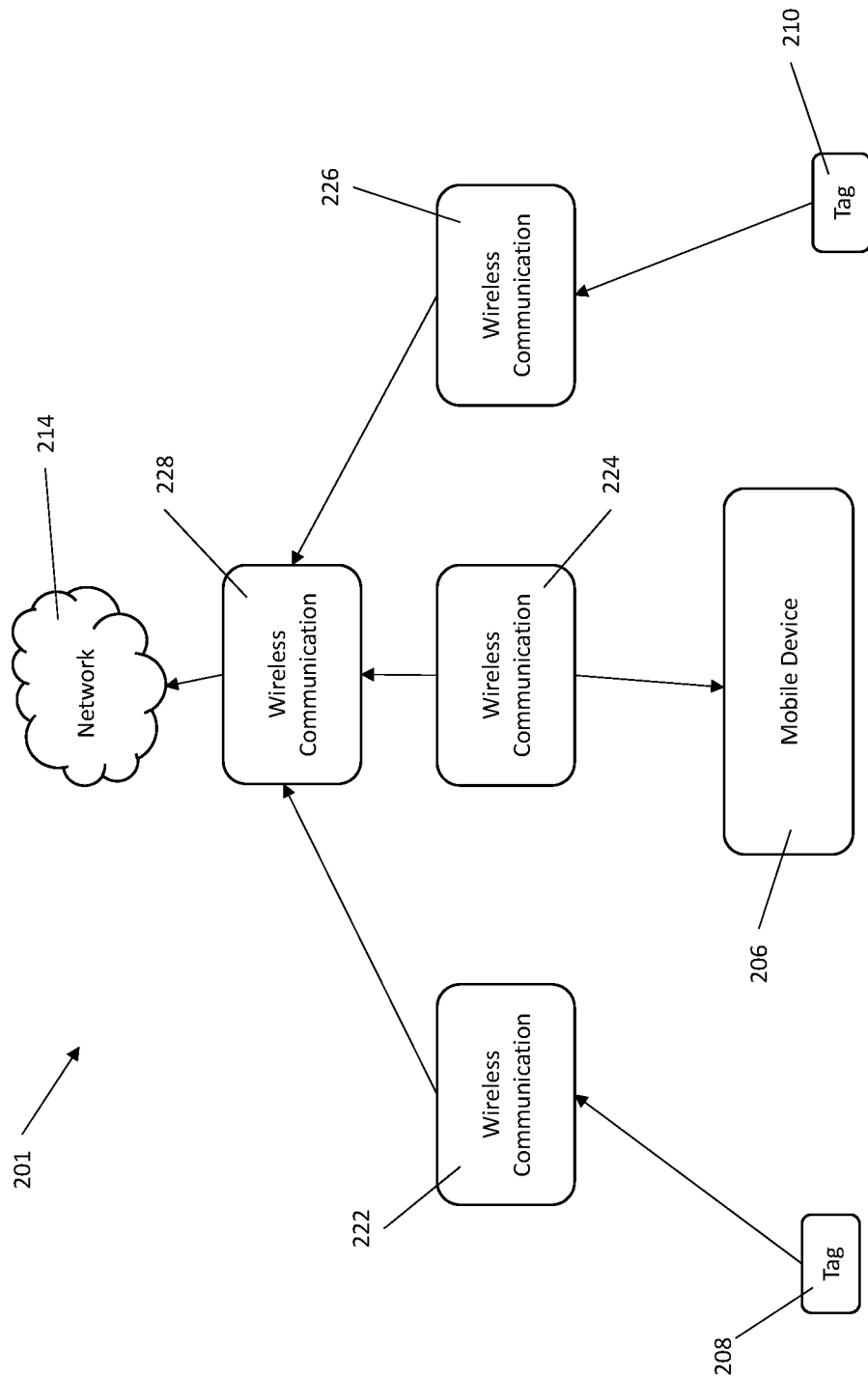
FIG. 2 illustrates an example of a network architecture for integrating functionality in a line powered device of a facility in accordance with an embodiment of the present disclosure.

FIG. 2 illustrates an example of a network architecture 201 for integrating functionality in a line powered device of a facility in accordance with an embodiment of the present disclosure. The line powered device can be, for example, line powered device 102 previously described in connection with FIG. 1.

As shown in FIG. 2, data (e.g., location data) can be communicated (e.g., sent) from mobile device 206 to the line powered device via wireless communication 224. Mobile device 206 can be, for example, mobile device 106 previously described in connection with FIG. 1. Wireless communication 224 can include, for example, Bluetooth (e.g., BLE) and/or Wi-Fi communication, as previously described in connection with FIG. 1.

As shown in FIG. 2, data (e.g., sensed data) can be communicated from sensor tags 208 and 210 to the line powered device via wireless communication 222 and 226, respectively. Sensor tags 208 and 210 can be, for example, sensor tags 108 and 110, respectively, previously described in connection with FIG. 1. Wireless communication 222 and 226 can include, for example, sub gigahertz (e.g., 900 megahertz) communication, as previously described in connection with FIG. 1.

The data communicated from mobile device 206 and sensor tags 208 and 210 to the line powered device can then be communicated from the line powered device to a computing device via wireless communication 228 illustrated in FIG. 2. The computing device may be, for example, computing device 112 previously described in connection with FIG. 1. Wireless communication 228 can include, for example, Bluetooth communication, as previously described in connection with FIG. 1.

The data can then be communicated from the computing device to an additional computing device via network 214 illustrated in FIG. 2. The additional computing device can be, for example, computing device 116 previously described in connection with FIG. 1. Network 214 van be, for example, network 114 previously described in connection with FIG. 1.

Figure 3:
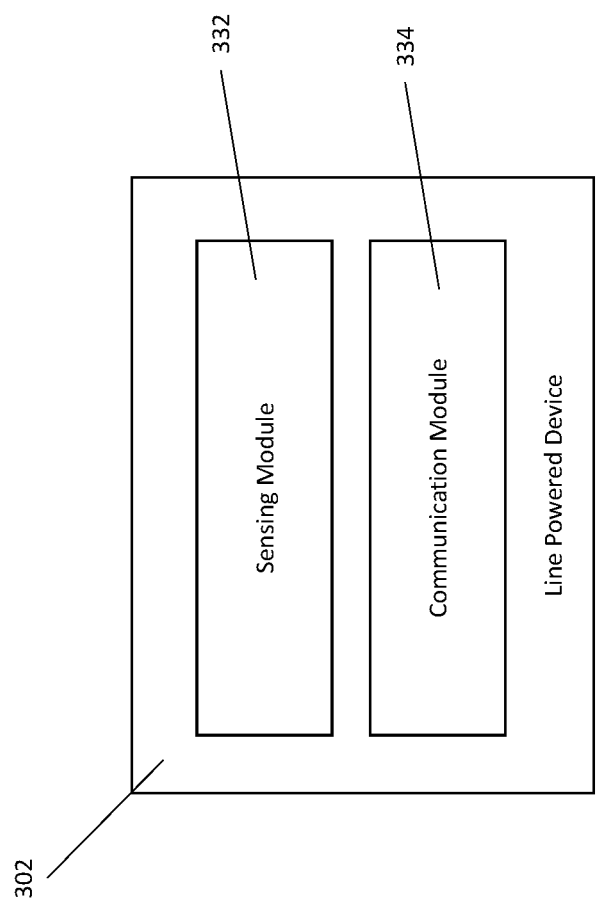
FIG. 3 illustrates an example of a line powered device of a facility having functionality integrated therein in accordance with an embodiment of the present disclosure.

FIG. 3 illustrates an example of a line powered device 302 of a facility having functionality integrated therein in accordance with an embodiment of the present disclosure. Line powered device 302 can be, for example, line powered device 102 previously described in connection with FIG. 1.

As shown in FIG. 3, line powered device 302 can include a sensing module 332 and a communication module 334. Sensing and communication modules 332 and 334 can be part of the functionality integrated in line powered device 302, as previously described in connection with FIG. 1.

Sensing module 332 may be used by line powered device 302 to sense data as part of the integrated functionality, as previously described in connection with FIG. 1. For example, sensing module 332 can include one or more sensors (e.g., one or more sensors can comprise the sensing module 332) that can sense data as part of the integrated functionality, as previously described in connection with FIG. 1.

Further, communication module 334 may be used by line powered device 302 to receive and send information as part of the integrated functionality, as previously discussed in connection with FIG. 1. For example, communication module 334 can be a radio communication module, and can include a signal receiver and signal transmitter that can send and receive, respectively, information as part of the integrated functionality, as previously described in connection with FIG. 1.

Figure 4:
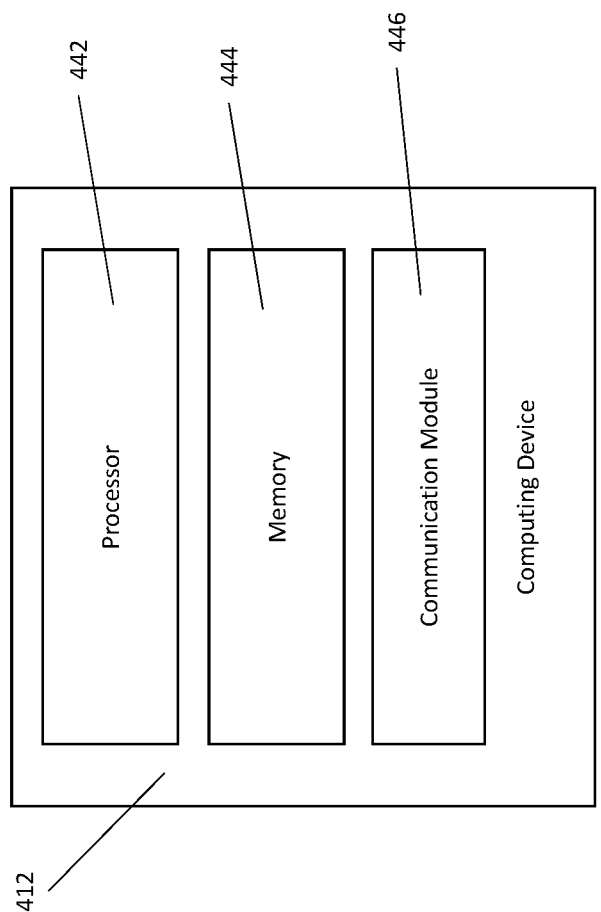
FIG. 4 illustrates an example of a computing device for integrating functionality in a line powered device of a facility in accordance with an embodiment of the present disclosure.

FIG. 4 illustrates an example of a computing device 412 for integrating functionality in a line powered device of a facility in accordance with an embodiment of the present disclosure. Computing device 412 can be, for example, computing device 112 previously described in connection with FIG. 1.

Computing device 412 can be, for example, a laptop computer, a desktop computer, or a mobile device. However, embodiments of the present disclosure are not limited to a particular type of computing device.

As shown in FIG. 4, computing device 412 can include a processor 442 and a memory 444. Memory 444 can be any type of storage medium that can be accessed by processor 442 to perform various examples of the present disclosure. For example, memory 444 can be a non-transitory computer readable medium having computer readable instructions (e.g., computer program instructions) stored thereon that are executable by processor 442 to perform various examples of the present disclosure. That is, processor 442 can execute the executable instructions stored in memory 444 to perform various examples of the present disclosure.

Memory 444 can be volatile or nonvolatile memory. Memory 444 can also be removable (e.g., portable) memory, or non-removable (e.g., internal) memory. For example, memory 444 can be random access memory (RAM) (e.g., dynamic random access memory (DRAM), resistive random access memory (RRAM), and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 444 is illustrated as being located in computing device 412, embodiments of the present disclosure are not so limited. For example, memory 444 can also be located internal to another computing resource (e.g., enabling computer readable instructions to be downloaded over the Internet or another wired or wireless connection).

As shown in FIG. 4, computing device 412 can include a communication module 446. Computing device 412 can use communication module 446 to receive information from line powered device 112, as previously described in connection with FIG. 1.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    integrating, in a line powered device of a facility that has a first functionality, a second functionality, wherein the second functionality includes a communication module;
    obtaining, by the line powered device, information associated with the facility using the second functionality;
    sending, by the communication module, the information associated with the facility obtained using the second functionality to a computing device;
    receiving, by the communication module, location data associated with equipment in the facility via a first type of wireless communication; and
    receiving, by the communication module, location data associated with people in the facility using a second type of wireless communication.

2. The method of claim 1, wherein the method includes sending, by the communication module, the information associated with the facility obtained using the second functionality to an additional line powered device via radio communication.

3. The method of claim 1, wherein integrating the second functionality in the line powered device includes adding the communication module to the line powered device.

4. The method of claim 1, wherein integrating the second functionality in the line powered device includes replacing a sensing mechanism in the line powered device having the first functionality with a different sensing mechanism having the first functionality and the second functionality.

5. The method of claim 1, wherein the method includes obtaining, by the line powered device, the information associated with the facility from an equipment tag.

6. The method of claim 1, wherein the method includes obtaining, by the line powered device, the information associated with the facility from a mobile device.

7. The method of claim 1, wherein the method includes obtaining, by the line powered device, the information associated with the facility from a sensor tag.

8. The method of claim 1, wherein the method includes adding, to the facility, an additional line powered device having the first functionality and the second functionality.

9. A computing device, comprising:
a memory; and
a processor configured to execute executable instructions stored in the memory to:
receive, from a line powered device of a facility that has a first functionality and a second functionality that was integrated in the line powered device, information associated with the facility obtained by the line powered device using the second functionality, wherein the second functionality includes a communication module configured to:
send the information associated with the facility obtained using the second functionality to the computing device;
receive location data associated with equipment in the facility via a first type of wireless communication; and
receive location data associated with people in the facility via a second type of wireless communication; and
send the information associated with the facility obtained by the line powered device using the second functionality to an additional computing device located remotely from the facility.

10. The computing device of claim 9, wherein:
the line powered device is part of an existing infrastructure of a facility;
the first functionality was part of the line powered device when the line powered device was installed in the existing infrastructure of the facility; and
the second functionality was integrated in the line powered device after the line powered device was installed in the existing infrastructure of the facility without adding to or altering the existing infrastructure of the facility.

11. The computing device of claim 9, wherein the information associated with the facility obtained by the line powered device using the second functionality includes space utilization data associated with the facility.

12. The computing device of claim 9, wherein the information associated with the facility obtained by the line powered device using the second functionality includes data sensed by the line powered device.

13. The computing device of claim 9, wherein the information associated with the facility obtained by the line powered device using the second functionality includes the location data associated with the people and the equipment in the facility.

14. A system, comprising:
a number of sensor devices that are part of an existing infrastructure of a facility, wherein each respective one of the number of sensor devices has a first functionality that was part of the sensor device when the sensor device was installed in the existing infrastructure of the facility and a second functionality that was integrated in the sensor device after the sensor device was installed in the existing infrastructure of the facility without adding to or altering the existing infrastructure of the facility; and
a computing device configured to receive, from the number of sensor devices, information associated with the facility obtained using the first functionality and the second functionality;
wherein the second functionality of each respective one of the number of sensor devices includes a communication module configured to:
send the information associated with the facility obtained using the first functionality and the second functionality to the computing device;
receive location data associated with equipment in the facility via a first type of wireless communication; and
receive location data associated with people in the facility via a second type of wireless communication.

15. The system of claim 14, wherein the number of sensor devices are configured to communicate with each other through a network using the second functionality.

16. The system of claim 14, wherein:
the first functionality of each respective one of the number of sensor devices includes a first type of sensing mechanism; and
the second functionality of each respective one of the number of sensor devices includes a second type of sensing mechanism.

17. The system of claim 14, wherein the communication module is configured to send the information associated with the facility obtained using the first functionality and the second functionality to an additional sensor device that is not part of the existing infrastructure of the facility.

* * * * *